United States Patent
Skelton et al.

(10) Patent No.: US 8,909,425 B2
(45) Date of Patent: Dec. 9, 2014

(54) SPEED-BASED FLOW DEVICE DIAGNOSTIC SYSTEM AND METHOD

(71) Applicant: GM Global Technology Operations LLC, Detroit, MI (US)

(72) Inventors: Scott M. Skelton, Belleville, MI (US); Kathryn D. Plastino, Courtice (CA)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 13/861,730

(22) Filed: Apr. 12, 2013

(65) Prior Publication Data
US 2014/0309854 A1   Oct. 16, 2014

(51) Int. Cl.
*B60K 1/00* (2006.01)
*G06F 19/00* (2011.01)

(52) U.S. Cl.
USPC .......................................... 701/36; 180/65.31

(58) Field of Classification Search
USPC ........................... 701/36; 180/65.31; 417/212
See application file for complete search history.

(56) References Cited

U.S. PATENT DOCUMENTS

| | | | |
|---|---|---|---|
| 7,762,788 B2 * | 7/2010 | Miyazaki et al. | 417/212 |
| 2010/0065355 A1 * | 3/2010 | Reddy | 180/65.31 |

* cited by examiner

*Primary Examiner* — Tan Q Nguyen
(74) *Attorney, Agent, or Firm* — Quinn Law Group, PLLC

(57) ABSTRACT

A vehicle or other system includes a flow device, component, and controller. The controller executes a method of diagnosing flow performance in the vehicle/system. The flow device is a pump, blower, or fan. A calibrated upper speed limit is commanded from the flow device in response to detected enabling conditions. The device is turned off after maintaining the upper speed limit for a calibrated duration. The speed of the flow device is determined during a coast-down interval defined by a period between command of the upper speed limit and attaining a calibrated lower speed limit. An absolute rate of change of the speed over the coast-down interval is calculated, with the controller executing a control action when a maximum absolute slope of the calculated rate of change falls outside of a calibrated range during the coast-down interval.

19 Claims, 2 Drawing Sheets

SPEED-BASED FLOW DEVICE DIAGNOSTIC SYSTEM AND METHOD

TECHNICAL FIELD

The present disclosure relates to a speed-based diagnostic system for a flow device, and to a method of using the same.

BACKGROUND

Fluid is circulated in automotive vehicles and other systems via a flow device. The flow device is typically a pump for liquids or coolants and a blower or fan when air is the cooling medium. The circulated fluid can be used to perform thermal management or fluid actuation functions. For instance, certain vehicle powertrains use a relatively high-voltage battery module as a source of electrical energy for powering one or more electric traction motors. The battery module and associated power electronics generate substantial amounts of heat during sustained use. Therefore, circulated fluid in the form of air or coolant is used to regulate the operating temperature of these components. Additionally, heating, ventilation, and air conditioning (HVAC) blowers are used to move air into and out of a vehicle cabin. In other applications, fluid may be circulated under pressure via a pump to provide a source of fluid power to a point of use, for instance to actuate a valve or a piston. Knowledge of the functional state of a given flow device is therefore essential to the overall control of the system.

SUMMARY

A system is disclosed herein having a flow device, a supply of fluid, a component, and a controller. The controller, which is in communication with the flow device, is configured to determine, without the use of flow sensors, whether the flow device is presently producing output flow. During a detected enabling condition such as a key event, the controller commands the speed of the flow device to a calibrated upper speed limit, allows the flow device to stabilize at the upper speed limit, and then turns the flow device off. In this stage, which is referred to as a "coast-down event" herein, the speed of the flow device gradually decreases to a calibrated lower speed limit as friction acts on the flow device.

The flow device may output a raw speed signal in the form of a frequency signal. The controller receives the frequency signal as the flow device coasts down to the lower speed limit, and calculates a rate of change of the underlying speed using a processor and associated control logic. The calculated absolute rate of change, which is an absolute slope value of the derivative of the speed, is compared via the controller to a calibrated speed range. The controller executes a control action with respect to the flow device when the calculated rate of change during coast-down of the flow device falls outside of this calibrated speed range.

A method is also disclosed herein that includes receiving, via a controller, a raw speed signal from a flow device in a system, detecting an enabling condition, and commanding an upper speed limit from the flow device via the controller in response to the detected enabling condition. The method also includes commanding a lower speed limit from the flow device after maintaining the upper speed limit for a calibrated duration, such that a speed of the flow device decreases to the lower speed limit over a calibrated coast-down interval, and calculating an absolute rate of change of the speed over the coast-down interval. The method further includes executing a control action with respect to the flow device when the calculated absolute rate of change falls outside of a calibrated range.

Additionally, a vehicle is disclosed that has a controller, a switching device, and a flow device controlled via periodic signals from the switching device, e.g., pulse width modulation (PWM), a local interconnect network (LIN), or a controller area network (CAN). The flow device is configured to output a raw speed signal, e.g., in the form of a feedback frequency signal. The vehicle further includes a battery module and power electronics in fluid communication with the flow device. The battery module and the power electronics are heated or cooled via fluid circulated by the flow device. The controller, which is in communication with the flow device via the switching device, detects a key event of the vehicle as an enabling condition and commands a calibrated upper speed limit from the flow device in response to the detected key event.

The controller then turns off the flow device after maintaining the calibrated upper speed limit for a calibrated duration, and determines a speed of the flow device during a coast-down interval defined by the period between the command of the upper speed limit and the attaining by the flow device of a calibrated lower speed limit, including processing the PWM feedback signals via a processor. Additionally, the controller calculates a rate of change of the speed over the coast-down interval, determines a maximum absolute slope, i.e., the absolute value of, the rate of change within the coast-down interval, and compares the maximum absolute slope to a calibrated maximum absolute slope of a calibrated flow device. A control action is executed via the controller with respect to the flow device when a variance between the maximum absolute slope and the calibrated maximum absolute slope exceeds a threshold.

The above features and advantages and other features and advantages of the present invention are readily apparent from the following detailed description of the best modes for carrying out the invention when taken in connection with the accompanying drawings.

DETAILED DESCRIPTION

Figure 1:
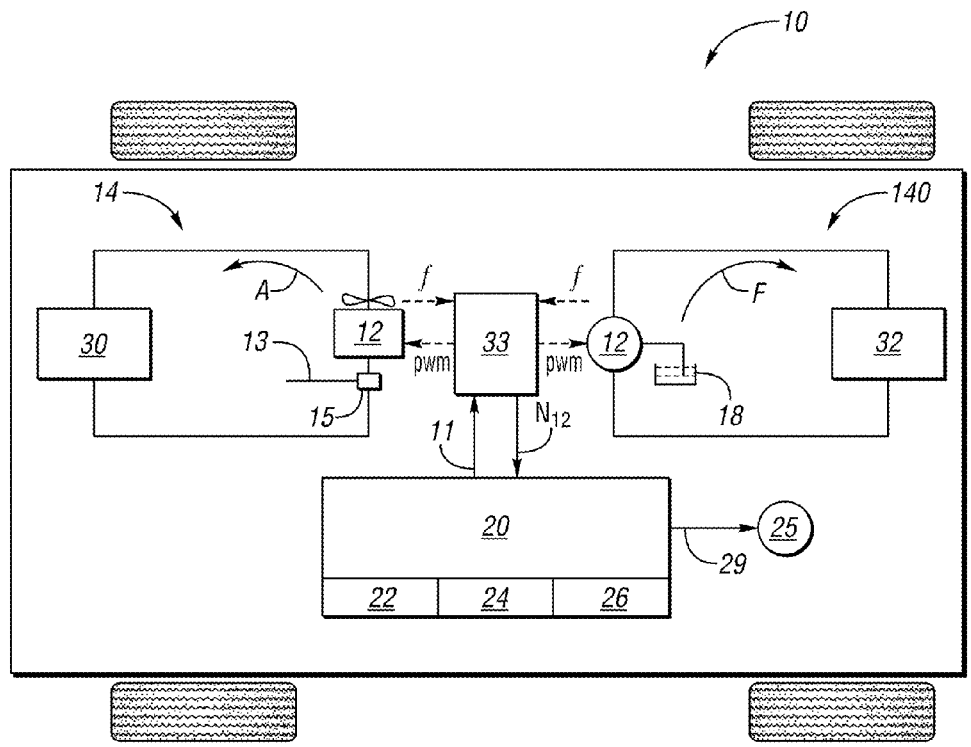
FIG. 1 is a schematic illustration of a vehicle having example flow devices and a controller which diagnoses the performance of the flow devices as set forth herein.

Referring to the drawings, wherein like reference numbers refer to the same or similar components in the several views, a system 10 is shown schematically in FIG. 1. The system 10 may be an example vehicle as shown. However, non-vehicular systems may be readily envisioned in the alternative without departing from the intended inventive scope, for instance industrial or residential building heating, ventilation, and air conditioning (HVAC) systems, fluid powered systems, or any other systems having a fluid circuit 14 and/or 140 of the type described below. The example vehicle of FIG. 1 will be described hereinafter for illustrative consistency. Therefore, the system 10 is referred to hereinafter as the vehicle 10.

The vehicle 10 of FIG. 1 may include one or more flow devices 12. As used herein, the term "flow device" refers to any fluid pump, blower, fan, or other flow device which provides a motive force sufficient for circulating a fluid, whether liquid, gas, or a combination thereof, within the corresponding fluid circuit 14 or 140. Only two flow devices 12 are shown in FIG. 1 for simplicity, with the flow device 12 of the fluid circuit 14 being a blower or fan and the flow device 12 of the fluid circuit 140 being a pump. More or fewer flow devices 12 may be used within the scope of the present invention.

The motive force imparted by the flow device(s) 12 is typically in the form of a torque applied to a rotatable finned or bladed shaft, as is well understood in the art. The present invention is intended to diagnose the performance of the flow devices 12, and in particular to diagnose the presence or absence of associated output flow from the flow devices 12 without requiring physical volumetric flow sensors. Instead, a controller 20 processes raw speed signals (arrow $N_{12}$) from the respective flow devices 12 during an enforced coast-down of a speed of the flow devices 12 from a calibrated upper speed limit ($N_U$) to a lower speed limit ($N_L$) (see FIG. 2). In this manner, the controller 20 of FIG. 1 determines whether the flow devices 12 are functioning properly. The setting and use of the upper and lower speed limits $N_U$ and $N_L$ is set forth in greater detail below with reference to FIGS. 2 and 3.

It is recognized herein that the flow devices 12, when in the form of conventional fans, blowers, or pumps, can spin at relatively high rates of speed without producing a corresponding output flow. Various failure modes may result in such an outcome, with a blocked flow path being a common example. Blockage may occur via admitted debris or hose damage. Other failure modes include an undetected fluid leak, or even a fractured, bent, or missing blade.

In an open-loop air cooling system such as the flow circuit 14 shown in FIG. 1, debris may be admitted to the flow paths via air intakes 13. As an example, some air cooling systems draw intake air from within a vehicle cabin, and therefore could become inadvertently blocked by passengers, cargo, or debris. While closed-loop liquid cooling or actuation systems such as the fluid circuit 140 tend to be less prone to experiencing a blocked flow path from externally-admitted debris, the possibility still exists for blockage to occur from other sources. For example, seal material debris may be present from degraded fluid seals, as well as metal shavings and other common contaminants. Blockage may also occur from partially or fully collapsed hoses or clamps, particularly in a fluid supply line.

In such a failure mode, the flow devices 12 shown in FIG. 1 could exhibit coast-down behavior that deviates from an expected performance relative to a calibrated/new flow device 12. The present diagnostic approach as executed by the controller 20 thus looks beyond the instantaneous speeds of the flow devices 12 and typical internal electrical diagnostic methods such as measuring a current feed to the flow device 12, both of which may or may not correspond to the presence of an output flow. While such conventional approaches could be used in conjunction with the present approach, the controller 20 of FIG. 1 specifically examines the rate of change in or slope of a speed of the flow device 12 during an enforced coast-down over a calibrated duration.

The present analysis is performed in response to a detected enabling condition such as vehicle start up/key-on or shutdown/key-off, i.e., a key cycle. As will be described below with reference to FIG. 2, the flow device 12 whose performance is being diagnosed is automatically shut off or fed with a reduced level of power at the calibrated upper speed limit ($N_U$) and thereafter allowed to "coast down" to a lower speed limit ($N_L$) at progressively slower rates of speed as fluid resistance, friction, and other forces gradually take effect.

Figure 2:
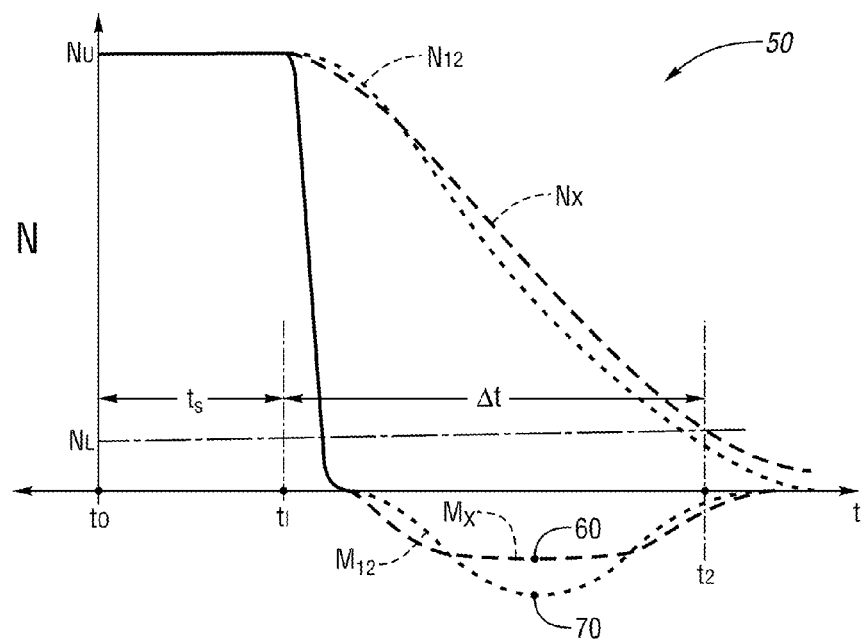
FIG. 2 is schematic illustration of traces describing a performance of an example flow device relative to that of a calibrated flow device.

As part of the present approach, the controller 20 of FIG. 1 calculates the derivative of the raw speed ($N_{12}$) of the flow device 12 between the upper speed limit ($N_U$) to the lower speed limit ($N_L$) shown in FIG. 2 so as to determine the maximum absolute slope during this coast-down interval. The maximum absolute slope is then compared to a calibrated range of allowable slopes. If the calculated maximum absolute slope falls outside of the calibrated range of allowable slopes, i.e., is either steeper or shallower by a recorded tolerance relative to a new, normal, or otherwise "known good" system using a properly functioning flow device 12, the controller 20 executes a control action with respect to the diagnosed fluid device 12 as described below with reference to FIG. 3.

Still referring to FIG. 1, the example fluid circuit 14, 140 may be a thermal management loop for circulating coolant to a component 30, 32 which generates heat in operation. Fluid circuit 14 provides a simplified example of an air-cooled loop, with arrow A representing circulated air in this example, wherein a flow device 12 in the form of a blower or a fan circulates air to the component 30. The component 30 may be associated power electronics for a high-voltage battery module when the vehicle 10 is configured as a hybrid electric or a battery electric vehicle. Such a fluid circuit 14 would require a fresh inlet of air from the ambient via the intakes 13, which may include a filter 15 and/or a flap so as to restrict entry of debris or other possible flow path obstructions. The structure of the fluid circuits 14 and 140 is greatly simplified in FIG. 1 for illustrative clarity. Those of ordinary skill in the art will appreciate that other components and devices would likely be present in the fluid circuits 14 and 140, such as heat exchangers, expansion valves, evaporators, condensers, relief valves, and the like.

The fluid circuit 14 provides a simplified example of a liquid or liquid/gas coolant loop, wherein a fluid (arrow F) in the form of oil, refrigerant, or coolant depending on the application is drawn from a sump 18 via the flow device 12, in this instance a fluid pump, and circulated under pressure to the component 32 being heated, cooled, or actuated. The component 32 could be the same type of component as the component 30, for instance a battery module or associated power electronics, or it could be a piston, valve, cylinder, or other hydraulically actuated device. Thus, the flow device 12 in the fluid circuit 140 may be embodied as a transmission, power steering, fuel, or water pump, and the flow device 12 of the fluid circuit 14 may be embodied as an HVAC blower or fan for directing heated or cooled air into a passenger compartment of the vehicle 10, without departing from the intended inventive scope.

In order to diagnose the flow performance of any of the flow device(s) 12 used in the vehicle 10 or other system, the controller 20 of FIG. 1 may be placed in communication with each flow device 12 whose performance is to be diagnosed. The controller 20 may be embodied as a computer device(s) having the requisite hardware and software elements for performing the tasks detailed in the example method 100 of FIG. 2. For instance, the controller 20 may include a processor 22, tangible, non-transitory memory 24, e.g., ROM, optical media, flash memory, etc., as well as any required transitory memory such as RAM and EEPROM. The controller 20 should also include all necessary input/output (I/O) devices, network interface cards, transceivers 26, and the like. Signals to and from the controller 20 may be respectively transmitted from and to the flow device(s) 12 via a suitable control link, e.g., transfer conductors, a controller area network (CAN) bus, serial connection, and/or wirelessly.

Control of the flow devices 12 of FIG. 1 may be accomplished, in one possible configuration, via pulse width modulation (PWM). In other configurations, a local interconnect network (LIN) or controller area network (CAN) may be used. As is well understood in the art, periodic signals, shown in FIG. 1 as PWM signals (arrow PWM), may be transmitted to the flow devices 12, in this example via a switching module 33, in response to commands (arrow 11) originating in the controller 20. The switching module 33 may be part of the controller 20 or the flow devices 12, or the switching module 33 may be a separate device.

In response to receipt of the PWM signals (arrows PWM), the speed of the flow devices 12 is determined and transmitted to the controller 20. The flow device(s) 12 may use any available technique for speed measurement, including for instance back EMF, current detection, encoder/Hall effect sensors, etc. The frequency feedback signal (arrow f) is then communicated to the controller 20 via the switching module 33 or other suitable structure in non-PWM embodiments, with the speed (arrow $N_{12}$) ultimately transmitted to or calculated by the controller 20.

The frequency feedback signal (arrow f) in the non-limiting embodiment of FIG. 1 is a frequency-modulated signal which encodes the speed ($N_{12}$) of the corresponding flow device 12. The feedback signal (arrow f) may be generated as part of any existing communications protocol. The controller 20 processes the received frequency domain data to determine the underlying speed (arrow N12) of the flow device 12, or receives the feedback signals (arrow f) directly to the same effect. The controller 20 of FIG. 1 then calculates, via the processor 22, the absolute rate of change in the speed ($N_{12}$) over a calibrated coast-down interval, i.e., d/dt $N_{12}$, in response to a predetermined enabling condition as explained below with reference to FIG. 3. The absolute rate of change has a corresponding slope ($M_{12}$) as shown in FIG. 2 that is compared by the controller 20 to a slope ($M_X$) of a known good system employing, for instance, a known good or calibrated flow device 12. The controller 20 then executes a control action via an output signal (arrow 29), for instance to a status indicator 25 or to memory 24.

Referring to FIG. 2, a set of traces 50 describes the underlying control approach as executed via the controller 20 of FIG. 1. FIG. 2 is a time plot, with time (t) plotted on the horizontal axis and speed N plotted on the vertical axis. Trace $N_{12}$ represents the speed of a given one of the flow devices 12. Thus, between $t_0$ and $t_1$ the flow device 12 is commanded to run at a steady-state speed, which in the example of FIG. 2 is the upper speed limit ($N_U$). At about $t_1$, after passage of a delay ($t_s$) suitable for stabilizing the speed ($N_{12}$) at the upper speed limit ($N_U$), the controller 20 of FIG. 1 turns off the flow device 12 and allows the flow device 12 to coast down to a calibrated lower speed limit ($N_L$). The upper speed limit ($N_U$) may be set to a maximum speed of the flow device 12 and the lower speed limit ($N_L$) to zero, or anywhere in between, with the latter possibility shown in FIG. 2 for the lower speed limit ($N_U$). The difference between the respective upper and lower speed limits ($N_U$ and $N_L$) should also be sufficiently large to provide the desired resolution, e.g., at least 70% of the maximum theoretical speed and less than about 25% of the minimum theoretical speed in one possible configuration.

Shortly after the flow device 12 is turned off, its speed begins to decay. The expected decay trajectory of a calibrated/properly performing flow device 12 is represented in FIG. 2 by trace $N_X$. A faulty flow device 12 may, however, exhibit a perceptibly different trajectory as represented by trace $N_{12}$. The controller 20 calculates the maximum absolute slope in the duration Δt between a turning off the flow device 12 at the upper speed limit ($N_U$) and eventually attaining the lower speed limit ($N_L$), i.e., at point 70 of a corresponding slope trace $M_{12}$, with this duration being the coast-down interval. The maximum absolute slope for the flow device 12 corresponds to point 70 in FIG. 2. The controller 20 then compares the maximum absolute slope of a calibrated flow device recorded in memory 24 of FIG. 1, i.e., point 60. A suitable control action is executed depending on an absolute value of the variance between points 60 and 70.

Figure 3:
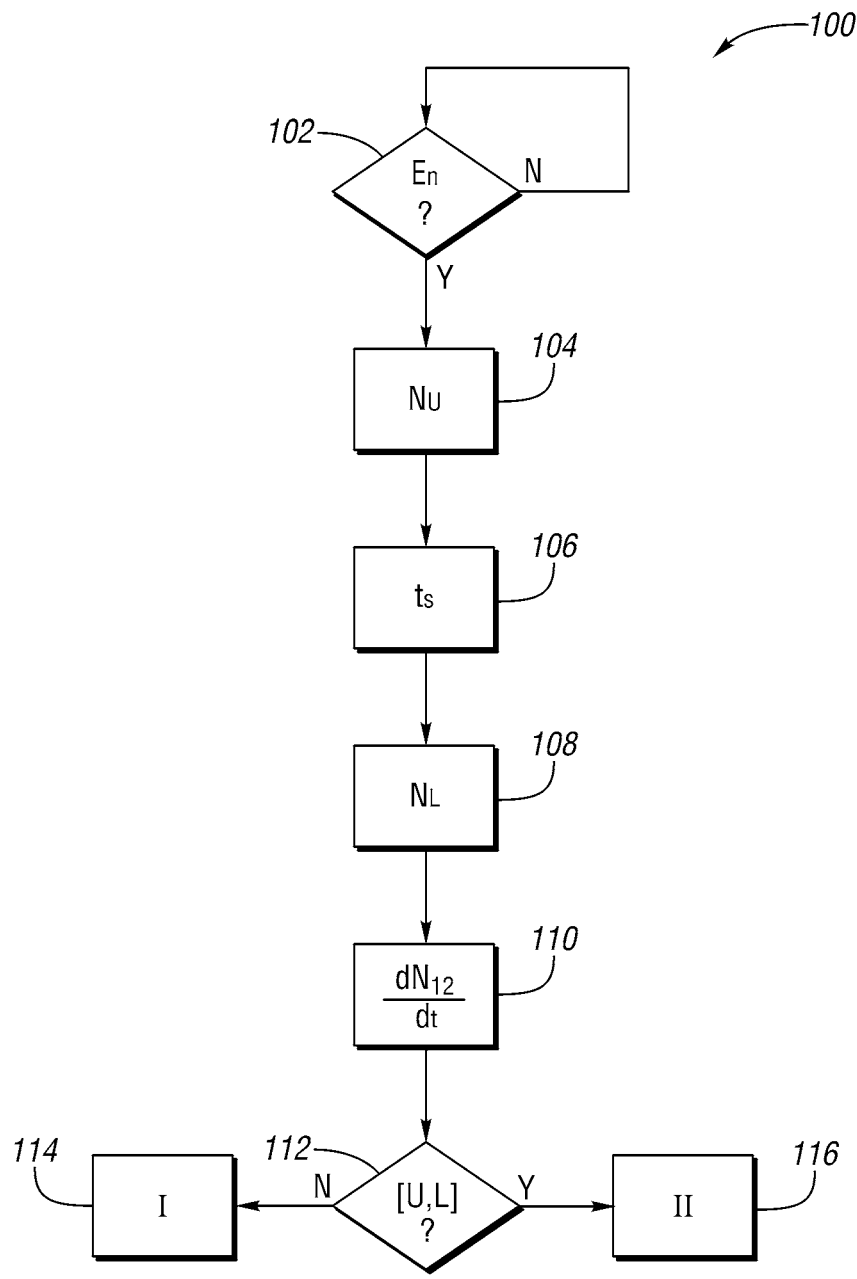
FIG. 3 is a flow chart describing a method for diagnosing one of the flow devices shown in FIG. 1.

Referring to FIG. 3, an example method 100 for diagnosing the performance of the flow devices 12 shown in FIG. 1 may be executed by the controller 20, with control actions ultimately executed by the controller 20 as a result of the diagnosis. The method 100 begins at step 102, wherein the controller 20 determines whether predetermined enabling condition (En) has been satisfied. Step 102 may entail, by way of example, detecting a start up or key-on event of the vehicle 10 of FIG. 1, alone or in conjunction with a temperature measurement of the component 30 or 32. That is, if the vehicle 10 of FIG. 1 has not been running for some time, the temperature of the component 30 or 32 may be sufficiently low, thus not requiring cooling for the duration of the following test. If the component 30 or 32 is actuated by fluid rather than heated or cooled by it, a different condition such as a particular transmission gear state could be used in the alternative, or vehicle shutdown/key-off may be used as the enabling condition.

The purpose of step 102 is to identify a period of time during which execution of the remaining steps of the method 100 could be conducted without unduly interfering with the normal heating, cooling, or actuation functionality of the flow device 12 being diagnosed. Because the flow device 12 will be commanded off for part of the following diagnostic test, the conditions of step 102 should be geared toward minimizing any perceptible impact on drive function while remaining as imperceptible as possible to the driver. The method 100 proceeds to step 104 once the enabling condition has been detected.

At step 104, the controller 20 of FIG. 1 commands the upper speed limit ($N_U$) from the particular flow device 12 whose performance is to be diagnosed. The upper speed limit ($N_U$) could be the maximum rotational speed of the flow device 12, its steady-state speed as shown in FIG. 2, or another speed value, provided the speed is sufficiently high for executing the subsequent steps of method 100. Part of step 104 may entail transmitting the PWM signals (arrow PWM) as shown in FIG. 1 to the flow device 12 via the switching module 33. The method 100 then proceeds to step 106.

Step 106 entails waiting for the speed previously commanded at step 104 to be reached and to sufficiently stabilize, which occurs after the duration $t_S$ of FIG. 2 has elapsed. Stabilization could entail activating a timer of the controller 20 of FIG. 1 to enforce a delay during which the speed of the flow device 12 should not change to within, e.g., ±5% of the commanded upper speed limit ($N_U$). The method 100 proceeds to step 108 once the speed of the flow device 12 has stabilized.

At step 108, the controller 20 of FIG. 1 turns off the flow device 12, such as by stopping transmission of the PWM signals (arrow PWM). The flow device 12 will continue to rotate of its own inertia even after power to the flow device 12 is interrupted, but at a gradually decreasing speed as friction and flow resistance take effect. The speed of the flow device 12 eventually decays to its calibrated lower speed limit ($N_L$) at $t_2$ of FIG. 2. As noted above, the lower speed limit ($N_L$) may be a non-zero value as shown in FIG. 2, or it may be zero. The raw speed frequency signals describing the speed of the flow device 12 are received and recorded by the controller 20 throughout the duration of the coast-down interval ($\Delta t$) of FIG. 2 from the upper speed limit ($N_U$) to the lower speed limit ($N_L$). The method 100 then proceeds to step 110.

Step 110 includes calculating, via the controller 20 of FIG. 1, the rate of change of the speed of the flow device 12 of FIG. 1 as it coasts down from the upper speed limit ($N_U$) commanded at step 104 to the lower speed limit ($N_L$) commanded at step 108. That is, the slope ($M_{12}$) is calculated as the derivative of the speed trace ($N_{12}$) of FIG. 2, i.e., the change in speed $\Delta N_{12}$ is divided by the elapsed time it takes to decrease in speed to the level of the lower speed limit ($N_L$). The method 100 then proceeds to step 112.

Step 112 entails finding the maximum absolute slope of the change in speed of the flow device over the coast-down interval ($\Delta t$), i.e., point 70 of FIG. 2, and then comparing the maximum absolute slope value to a calibrated range [U, L] of slope values to determine whether the maximum absolute slope value from step 110 exceeds or is less than the limits of this range, i.e., the absolute value of the variance between point 70 and point 60 of FIG. 2 is an acceptable value.

While the example of FIG. 2 shows a speed signal (trace $N_{12}$) that slows down faster than the corresponding calibrated speed signal ($N_X$), and thus a resultant slope (trace $M_{12}$) having a maximum value at point 70 that exceeds that of the calibrated slope ($M_X$), which may be indicative of certain failures such as a blocked flow path, the opposite could occur in other failure modes. For example, given a fluid leak or a broken fan blade, assuming the latter does not immediately lock up the flow device 12, a reduced fluid resistance would act on the rotating portions of the flow device 12, thus slowing the rate of descent of the speed of the flow device 12 during the coast-down interval ($\Delta t$) shown in FIG. 2. Step 112 proceeds to step 114 when the maximum absolute slope falls outside of the calibrated range, and to step 116 when the maximum absolute slope lies within this range.

At step 114, the controller 20 of FIG. 1 executes a first control action (I) corresponding to the failure mode that is suspected, i.e., a possible obstructed or clogged flow path when the maximum absolute slope is steeper than allowed, or a possible fluid leak or broken blade when the maximum absolute slope is shallower than allowed. Step 114 may entail recording a diagnostic code in memory 24 of the controller 20, transmitting a diagnostic code to a remote location via a telematics unit (not shown), or activating the indicator 25 of FIG. 1 to provide a visible and/or audible alarm notifying the driver that the flow device 12 should be serviced. Step 114 could include temporarily disabling the component 30 and/or 32, and/or disabling the flow device 12, so as to protect the components 30, 32 or flow devices 12.

Step 116, much like step 114, includes executing a second control action (II) corresponding to a passing diagnostic. As such diagnostics are not typically indicated to a driver, step 116 may entail recording a passing diagnostic code in memory 24 without more, or passing a passing diagnostic result to a remote source via a telematics unit.

While the best modes for carrying out the invention have been described in detail, those familiar with the art to which this invention relates will recognize various alternative designs and embodiments for practicing the invention within the scope of the appended claims

The invention claimed is:

1. A system comprising:
    a flow device having a speed, wherein the flow device is configured to output a raw speed signal;
    a component in fluid communication with the flow device; and
    a controller in communication with the flow device that is configured to:
        detect an enabling condition;
        command a calibrated upper speed limit from the flow device in response to the detected enabling condition;
        turn off the flow device after maintaining the calibrated upper speed limit for a calibrated stabilization interval;
        determine the speed of the flow device during a coast-down interval that is defined by the period between the command of the upper speed limit and attainment by the flow device of a calibrated lower speed limit;
        calculate a rate of change of the speed over the coast-down interval; and
        execute a control action with respect to the flow device when a maximum value of the calculated rate of change falls outside of a calibrated range.

2. The system of claim 1, wherein the system is a vehicle, and wherein the enabling condition is a key event of the vehicle.

3. The system of claim 2, wherein the component is at least one of a battery module and power electronics of the vehicle.

4. The system of claim 1, wherein the calibrated range is an allowable range of a maximum absolute slope of a calibrated or new flow device over the same calibrated coast-down interval.

5. The system of claim 1, wherein the flow device is a fluid pump and the component is cooled or heated via fluid circulated by the fluid pump.

6. The system of claim 1, wherein the flow device is a fluid pump and the component is actuated via fluid circulated by the fluid pump.

7. The system of claim 1, wherein the flow device is a blower or fan, and the component is cooled or heated via air circulated by the blower or fan.

8. The system of claim 1, wherein executing a control action includes at least one of disabling the flow device and disabling the component.

9. A method comprising:
    receiving, via a controller, a raw speed signal from a flow device in a system;
    detecting an enabling condition;
    commanding an upper speed limit from the flow device via the controller in response to the detected enabling condition;
    commanding a lower speed limit from the flow device after maintaining the upper speed limit for a calibrated duration, such that a speed of the flow device decreases to the lower speed limit over a calibrated coast-down interval;
    calculating a rate of change of the speed between the upper and lower speed limits over the coast-down interval; and
    executing a control action with respect to the flow device when the calculated rate of change falls outside of a calibrated range.

10. The method of claim 9, wherein the system is a vehicle, and wherein the detecting the enabling condition includes detecting a key event of the vehicle.

11. The method of claim 10, wherein the component is at least one of a battery module and power electronics of the vehicle.

12. The method of claim 9, wherein the calibrated range is an allowable range of a maximum absolute slope over the same calibrated coast-down interval of a known good system having a calibrated flow device.

13. The method of claim 9, wherein the flow device is a fluid pump and the component is cooled or heated via fluid circulated by the fluid pump.

14. The method of claim 9, wherein the flow device is a fluid pump and the component is actuated via fluid circulated by the fluid pump.

15. The method of claim 9, wherein the flow device is a blower or fan, and the component is cooled or heated via air circulated by the blower or fan.

16. The method of claim 9, wherein receiving a raw speed signal includes receiving a frequency signal in the form of pulse with modulation (PWM) feedback signals, local interconnect network (LIN) signals, or controller area network (CAN) signals.

17. A vehicle comprising:
 a switching device;
 a flow device controlled via pulse width modulation (PWM) signals from the switching device, and having a speed and configured to output a raw speed frequency signal in the form of PWM feedback signals;
 a battery module and power electronics in fluid communication with the flow device, wherein the battery module and the power electronics are heated or cooled via fluid circulated by the flow device; and
 a controller in communication with the flow device via the switching device that is configured to:
  detect a key event of the vehicle;
  command a calibrated upper speed limit from the flow device in response to the detected enabling condition;
  turn off the flow device after maintaining the calibrated upper speed limit for a calibrated duration;
  determine a speed of the flow device during a coast-down interval defined by the period between the command of the upper speed limit and attainment by the flow device of a calibrated lower speed limit, including processing the PWM feedback signals via a processor;
  calculate a rate of change of the speed over the coast-down interval;
  determining a maximum absolute slope of the rate of change within the coast-down interval;
  comparing the maximum absolute slope to a calibrated maximum absolute slope of a calibrated flow device; and
  execute a control action with respect to the flow device when a variance between the maximum absolute slope and the calibrated maximum absolute slope exceeds a threshold.

18. The vehicle of claim 17, wherein the flow device is a fluid pump and the fluid is a refrigerant or coolant.

19. The vehicle of claim 17, wherein the flow device is a blower or a fan and the fluid is air.

\* \* \* \* \*